Patented Apr. 21, 1953

2,636,041

UNITED STATES PATENT OFFICE 2,636,041

PROCESSES FOR PURIFICATION OF 3,12-DIHYDROXY-7 KETO-CHOLANIC ACID

Bernard Gauthier, Antony, France, assignor to Chimie et Atomistique, Paris, France, a French body corporate No Drawing. Application April 25, 1951, Serial No. 222,952. In France April 11, 1951

3 Claims. (Cl. 260—397.1)

The present invention relates to the purification of 3,12-dihydroxy-7-keto-cholanic acid.

It has for its object to provide an improved process for the purification of 3,12-dihydroxy-7-keto-cholanic acid. Said process comprises esterifying by heating with formic acid the crude product of controlled oxidation of cholic acid, crystallizing in the reaction mixture medium the diformyl derivative of 3,12-dihydroxy-7-keto-cholanic acid obtained, isolating the crystals of said diformyl derivative and saponifying it.

It is well known that in the controlled oxidation of cholic acid (3,7,12-trihydroxy-cholanic acid), the oxidation acts first on the hydroxy group at position 7 giving 3,12-dihydroxy-7-keto-cholanic acid, whether the oxidizing agent be bromine in aqueous bicarbonate medium (Charonnet and Horeou, French Patent No. 854,817, and U. S. A. Patent No. 2,244,328), potassium permanganate in neutral medium (Charonnet and Bernard Gauthier, French Patent No. 928,083) or chromium oxide and its derivatives (Hoehn, U. S. A. Patents Nos. 2,321,598 and 2,374,680; J. Am. Chem. Soc., 1943, 65, 485 and 1945, 67, 312), (Haslewood, J. Biol. Chem., 1943; 37, 109; 1944, 38, 108).

The oxidation, although orientating in a selective way towards the production of the mono-ketonic compound at position 7, produces, however, a mixture of ketonic compounds and residual cholic acid, in which the required acid clearly predominates. Secondary products may form such as diketonic acids and the dehydrocholic (triketonic) acid. If the initial cholic acid is of industrial quality, which is polluted with desoxycholic (dihydroxy-cholanic) acid, it is oxidized in the same way and the mixture obtained is still more complex.

Gallagher and Long (J. Biol. Chem., 1943, 147, 131), state that there forms during the oxydation with chromium oxide: 40% 3,12-dihydroxy-7-keto-cholanic acid, 40% 3-hydroxy 7,12 diketo-cholanic acid, and 20% 3,7,12-triketo-cholanic acid.

It is possible, however, by employing the bromine process and in operating under very strict conditions of concentration and temperature, to obtain the required compound already very pure (melting point 155°–160° C. whereas the pure product has a melting-point of 170–171° C.) and with very good yields.

The purification of the complex reaction product presents this other difficulty that the direct crystallization in diluted alcohol or in ethyl acetate gives rise to considerable loss of substances. Certain measures have been recommended, such as the preparation of the ethyl ester of the crude acid and saponification thereof (Hoehn and Linsk J. Am. Chem. Soc., 1945, 67, 312); or the conversion of the ketonic group into semi-carbazone and subsequent regeneration of the ketonic group (Haslewood, Biochem. J., 1943, 37, 109, Schneider and Hoehn, J. Am. Chem. Soc., 1943, 65, 485; Hoehn, U. S. A. Patent No. 2,321,598); or the preliminary esterification of the hydroxyl group at position 3 of the cholic acid, then controlled oxidation of the hydroxyl group at position 7 and finally hydrolysis of the ester (Haslewood, Bioch. J., 1944, 38, 108; Hoehn, U. S. A. Patents Nos. 2,374,680 and 2,398,709); or chromatographic separation (Gallagher and Long, J. Biol. Chem. 1943, 147, 131).

All these methods are long and give low yields, as little as 30–45%, and result in an acid of a considerably varying purity.

The process of purification, according to the invention of the crude oxidized product is much simpler, much better adapted to industrial methods than the recommended methods up to the present time and produces with the best yields a product of very high purity. As mentioned above, this process depends on the transformation of crude 3,12-dihydroxy-7-keto cholanic acid into its diformyl derivative according to the following formula:

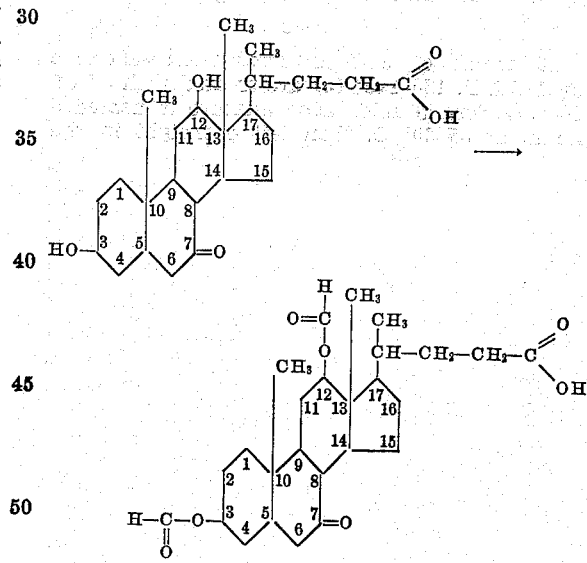

by means of a simple heating of the product in formic acid. This derivative crystallizes spontaneously in the pure state (M. P. 198–200°) and can be drained without difficulty. By means of saponification, it gives up the original compound without its impurities (M. P. 167–170° C., rotatory power $(a)_D=0°\pm2°$) and comparable with the best samples prepared up to this time (Charonnet and Horeau, M. P. 171° C., $(a)_D=-4°5$; Hoehn and Linsk, M. P. 170–171°). The yields reach 50–60%.

The following non-limitative examples will help explain the invention.

Example 1

20 grams of industrial 3,12-dihydroxy-7-keto-cholanic acid (M. P. 130–145° C.) are treated with 30 cc. of 96–98% formic acid. The mixture is heated for 5 hours at 55–60° C., then left overnight in a freezer. The crystals formed (start the crystallization if necessary) are drained and washed with a little diluted alcohol. The product obtained has a melting point of 194–196° C. The yield is 10–12 g.

The 3,12-diformoxy-7-keto-cholanic acid, thus isolated is boiled for 1 hour with 150 cc. of a normal sodium hydroxide aqueous solution. The obtained solution is cooled and mixed with a 10% hydrochloric acid solution until total precipitation. Thus, from 8 to 9.5 grams of 3,12-dihydroxy-7-keto-cholanic acid are isolated having a melting point of 160–162° C. The yield is 90–95%.

Example 2

50 grams of 3,12-dihydroxy-7-keto-cholanic acid (M. P. 157–160° C.) obtained by selective oxidation of pure cholic acid with a melting point of 194–195° C. with the aid of bicarbonate bromine solution, are treated by 50 g. of pure 96–98% formic acid. The mixture is heated 3 hours at 55–60° C. then left overnight in a freezer. The crystals formed are drained and washed with a little diluted alcohol. The melting point is 198–200° C. and the yield 30–40 g.

The 3,12-diformoxy-7-keto-cholanic acid thus isolated is boiled for 1 hour with 200 cc. of an 8% sodium hydroxide aqueous solution. The solution obtained is cooled and mixed with a 10% acetic acid solution until total precipitation. Thus 25–30 g. of 3,12-dihydroxy-7-keto-cholanic acid having a melting point 167–168° C. is isolated. The yield is 90–95%. $[a]_D=0°\pm2°$.

Example 3

20 grams of 3,12-dihydroxy-7-keto-cholanic acid (M. P. 130–145° C.) are treated with 30 cc. 96–98% formic acid. The mixture is heated 5 hours at 55–60° C. then left overnight in the freezer. The crystals formed (start the crystallization if necessary) are drained. The melting point is 193–194° C. and the yield 10–12 g.

The 3,12-diformoxy-7-keto-cholanic acid obtained, recrystallized in diluted alcohol, was found to have a melting point of 198–200° C. and a yield of 80%.

This acid is boiled for 1 hour with 90 cc. of a 10% potassium hydroxide aqueous solution. The solution obtained is cooled and mixed with 10% hydrochloric acid solution until pH.3.6–7.8 g. of 3,12-dihydroxy-7-keto-cholanic acid with a melting point of 165–168° C. are isolated.

The rotatory power of the acid was found to be $$[a]_D=0°\pm2°$$

Any departure from the above description which conforms to the present invention is intended to be included within the scope of the claims.

Having now described my invention what I claim as new and desire to secure by Letters Patent is:

1. Process for the purification of 3,12-dihydroxy-7-keto-cholanic acid comprising esterifying by heating with formic acid the crude product of controlled oxidation of cholic acid, crystallizing directly in the reaction mixture medium the diformyl derivative of 3,12-dihydroxy-7-keto cholanic acid obtained, isolating the crystals of said diformyl derivative and saponifying it.

2. A process as claimed in claim 1 wherein the crystals of said diformyl derivative are re-crystallized before saponification thereof.

3. In a process for the preparation of pure 3,12-dihydroxy-7-keto-cholanic acid from the crude product of controlled oxidation of cholic acid, the steps which comprise adding formic acid to said crude product, heating the mixture thus obtained thereby esterifying the crude product, crystallizing directly in the reaction mixture the diformyl derivative of 3,12-dihydroxy-7-keto-cholanic acid obtained, isolating the crystals of said diformyl derivative and saponifying it.

BERNARD GAUTHIER.

References Cited in the file of this patent

Hoehn, Jour. Am. Chem. Soc. 67, 740–743 (1945).

Gauthier et al., Chem. Abst. 42, col. 7308–7309 (1948).